(12) United States Patent
Thompson et al.

(10) Patent No.: US 7,389,382 B2
(45) Date of Patent: Jun. 17, 2008

(54) ISCSI BLOCK CACHE AND SYNCHRONIZATION TECHNIQUE FOR WAN EDGE DEVICE

(75) Inventors: Dave Thompson, Rogers, MN (US); Timothy Kuik, Lino Lakes, MN (US); Mark Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/149,123

(22) Filed: Jun. 8, 2005

(65) Prior Publication Data

US 2006/0282618 A1 Dec. 14, 2006

(51) Int. Cl.
*G06F 12/00* (2006.01)

(52) U.S. Cl. .................. 711/118; 711/129; 711/130; 710/22

(58) Field of Classification Search .................. 711/118
See application file for complete search history.

(56) References Cited

U.S. PATENT DOCUMENTS

| | | | |
|---|---|---|---|
| 7,111,138 B2* | 9/2006 | Higaki et al. ............... | 711/162 |
| 2002/0091844 A1* | 7/2002 | Craft et al. ................. | 709/230 |
| 2003/0154412 A1* | 8/2003 | Hetzler et al. ............. | 713/202 |
| 2004/0117438 A1* | 6/2004 | Considine et al. .......... | 709/203 |
| 2006/0080505 A1* | 4/2006 | Arai et al. .................. | 711/114 |

OTHER PUBLICATIONS

Muthitacharoen, Athicha, et al. "A Low-Bandwidth Network File System", MIT Laboratory for Computer Science and NYU Department of Computer Science.
Satran, Julian, et al. "iSCSI", Internet Draft, IP Storage Working Group, IETF, Jan. 19, 2003.
Azagury, Alain, "Supporting Continuous Availability", IBM , IBM Labs in Haifa, Third Intelligent Storage Consortium University of Minnesota. © 2005 IBM Corporation, May 2005, 28 pp.

* cited by examiner

*Primary Examiner*—Donald Sparks
*Assistant Examiner*—Hashem Farrokh
(74) *Attorney, Agent, or Firm*—Dean E. Wolf; Weaver Austin Villeneuve & Sampson LLP

(57) ABSTRACT

A technique is described for facilitating block level access operations to be performed at a remote volume via a wide area network (WAN). The block level access operations may be initiated by at least one host which is a member of a local area network (LAN). The LAN includes a block cache mechanism configured or designed to cache block data in accordance with a block level protocol. A block level access request is received from a host on the LAN. In response to the block level access request, a portion of block data may be cached in the block cache mechanism using a block level protocol. In at least one implementation, portions of block data in the block cache mechanism may be identified as "dirty" data which has not yet been stored in the remote volume. Block level write operations may be performed over the WAN to cause the identified dirty data in the block cache mechanism to be stored at the remote volume.

30 Claims, 11 Drawing Sheets

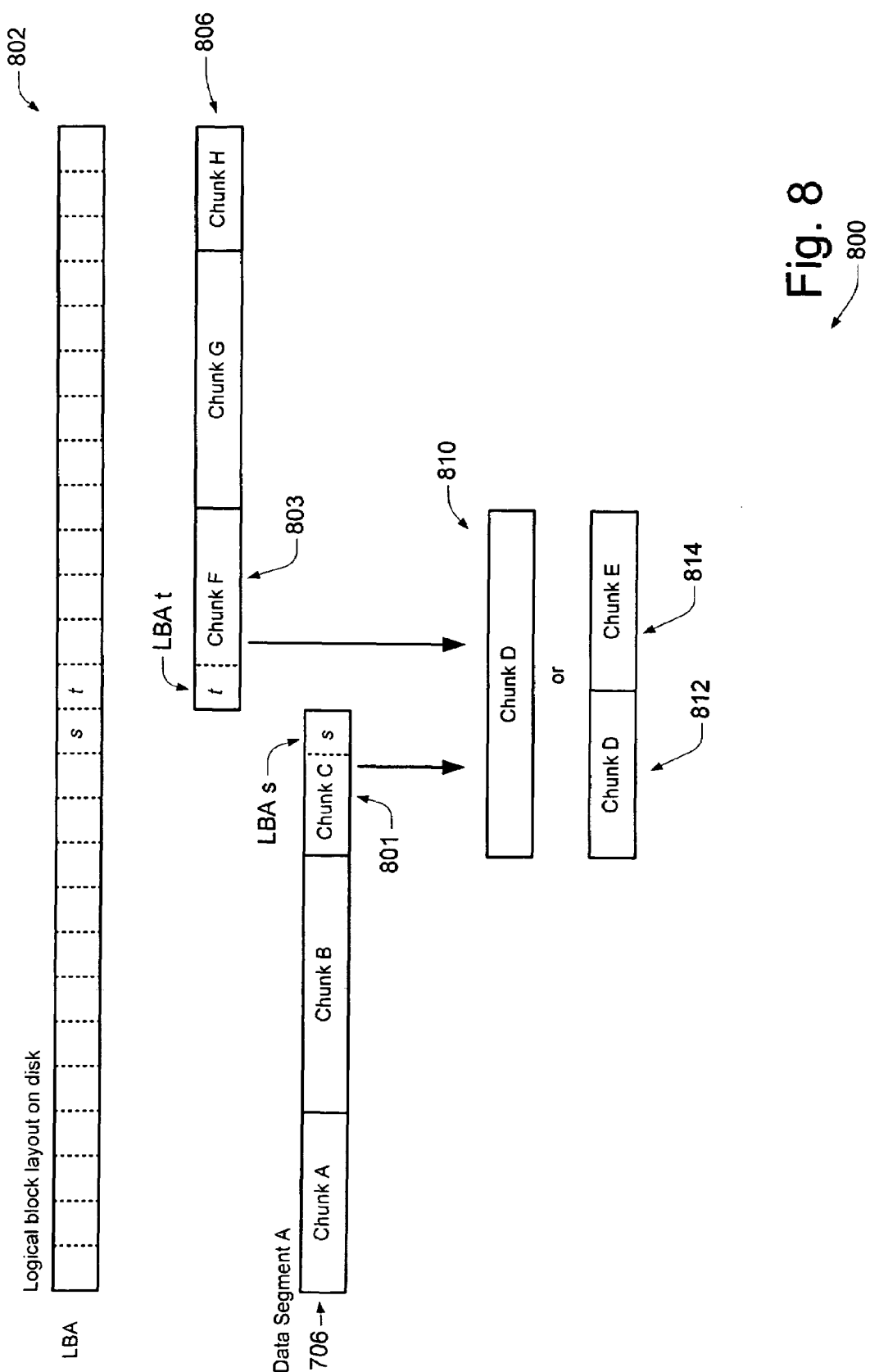

US 7,389,382 B2

ISCSI BLOCK CACHE AND SYNCHRONIZATION TECHNIQUE FOR WAN EDGE DEVICE

BACKGROUND OF THE INVENTION

1. Field of the Invention

The present invention relates to computer networks, and more particularly, to an apparatus and method for consolidating block level access to remote storage.

2. Background of the Invention

With the increasing popularity of Internet commerce and network centric computing, businesses and other organizations are becoming more and more reliant on information. To handle all of this data, wide area file systems such as, for example, the Cisco Wide Area File System (WAFS) (manufactured by Cisco Systems, Inc., of San Jose, Calif.), have become very popular.

The Cisco WAFS file engine eliminates the need for branch office file servers by consolidating remote storage with a data center for file level access via file level access protocols such as the Common Internet File System (CIFS) and Network File System (NFS). However, conventional wide area file systems WAFS do not currently provide a solution for consolidating block level access to a centralized block storage data center.

Accordingly, it will be appreciated that there exists a need for mechanisms which provide solutions for consolidating block level access to remote storage.

SUMMARY OF THE INVENTION

Various aspects of the present invention are directed to different methods, systems, and computer program products for facilitating block level access operations to be performed at a remote volume via a wide area network (WAN). The block level access operations may be initiated by at least one host which is a member of a local area network (LAN). The LAN includes a block cache mechanism configured or designed to cache block data in accordance with a block level protocol. A block level access request is received from a host on the LAN. In response to the block level access request, a portion of block data may be cached in the block cache mechanism using a block level protocol. In at least one implementation, portions of block data in the block cache mechanism may be identified as "dirty" data which has not yet been stored in the remote volume. Block level write operations may be performed over the WAN to cause the identified dirty data in the block cache mechanism to be stored at the remote volume. In specific embodiments where the block level access request corresponds to a block level read request for accessing a desired portion of block data corresponding to a location in the remote volume, at least a portion of the desired block data may be retrieved from the block cache mechanism using the block level protocol and provided to the requesting host. Additionally, in specific embodiments where the block level access request corresponds to a block level write request for storing a desired portion of block data at a location in the remote volume, the desired portion of block data may be cached in the block cache mechanism. Thereafter, the block level write operation may be performed to cause the desired portion of block data in the block cache mechanism to be stored at the remote volume. According to a specific embodiment, if the remote volume is determined to be unavailable or inaccessible, then the block write operation may be deferred until a time when it is determined that the remote volume is accessible.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 7 and 8 show examples techniques of the present invention which may be used for separating or dividing data segments into chunks.

DETAILED DESCRIPTION OF THE PREFERRED EMBODIMENTS

Figure 1:
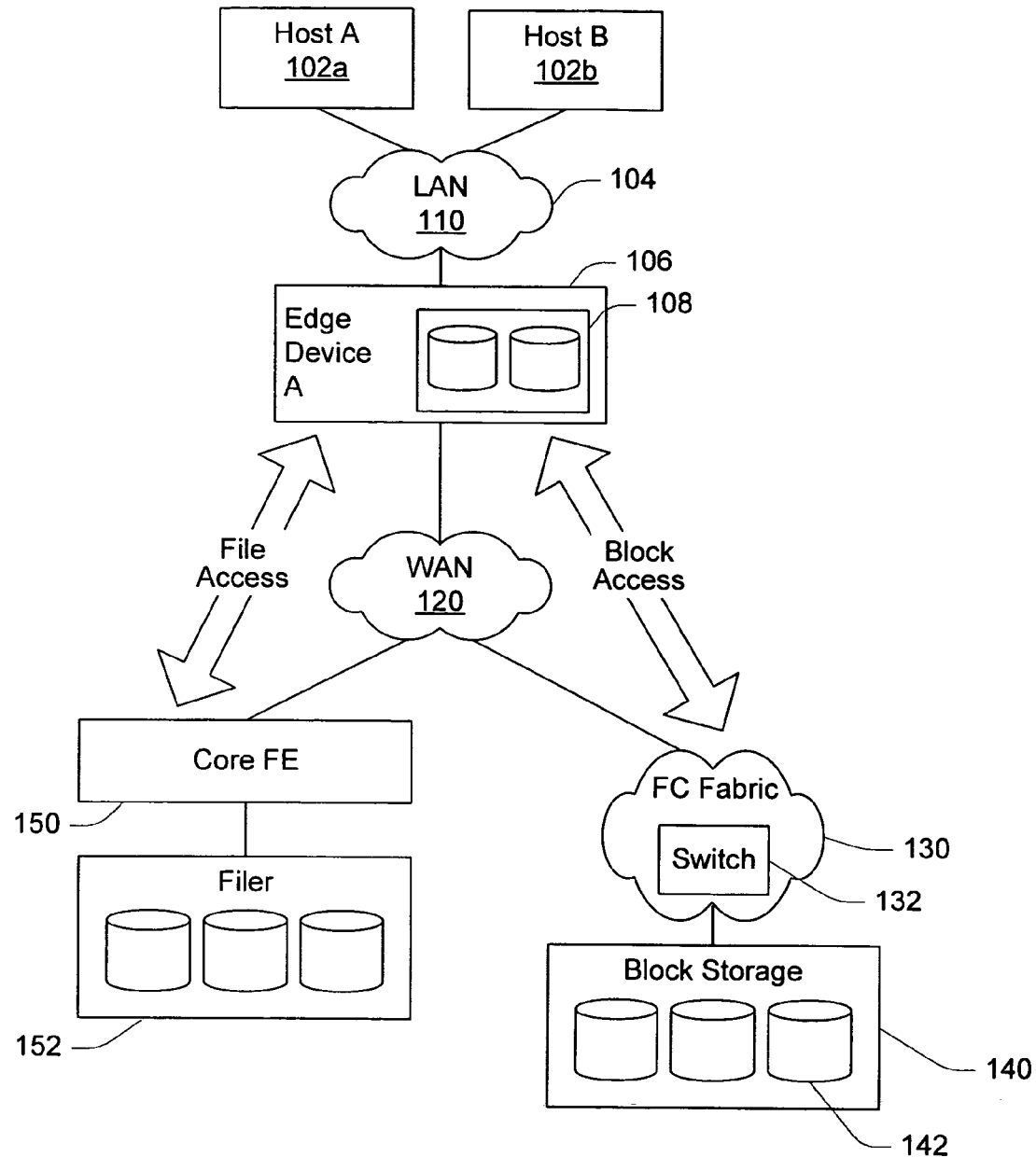
FIG. 1 shows a block diagram of a network portion 100 which may be used for illustrating various aspects of the present invention.

As described in greater detail below, different embodiments of the present invention provide block level access and block data consolidation mechanisms which may be implemented over a wide area network (WAN). In at least one implementation, the technique of the present invention may be implemented utilizing an edge caching mechanism to provide features and/or benefits which are similar to those provided by conventional wide area file systems.

Although conventional WAFS systems are able to consolidate remote storage with a data center for file level access via file level access protocols, many applications running on the LAN side of the WAFS may require block storage access to data storage located either remotely or locally. Such applications may include, for example, Microsoft Exchange database applications, SQL Server applications, Oracle database applications, etc.

Typically, block level access is enabled in storage area networks or SANs. A SAN typically includes a number of storage devices, a plurality of Hosts, and a number of switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the following publications: ANSI INCITS 373-2003, Fibre Channel Framing and Signaling Interface (FC-FS); ANSI INCITS 384-2004, Fibre Channel-Switch Fabric-3 (FC-SW-3); and ANSI INCITS 387-2004, Fibre Channel-Generic Services-4 (FC-GS-4); all of which are incorporated herein by reference for all purposes.

In conventional Fibre Channel, each device (e.g., hosts, storage devices and switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FCID), allocated dynamically to the end devices by the fabric. A unique FCID is assigned to a host device or disk device when the device logs in to the fabric. Additionally, each switch in the fabric is assigned a specific domain by the domain manager when the switch is connected to the fabric. All the devices connected to a given switch will have the DomainID of the switch as the first byte of their FCIDs. This "Domain" value is used for routing the frames within the fabric. Each FC frame header will include an SID field representing the source FCID, and a DID field representing the destination FCID.

Fibre Channel based SANs are often organized into zones. Within each zone, Hosts can see and access only storage devices or other Hosts belonging to that zone. This allows the coexistence on the same SAN of different computing environments. Additionally, zoning allows the partition of a Fibre Channel fabric into smaller fabrics to allow the implementation of features such as security and restrictions. Devices belonging to a single functional group are typically placed under the same zone. For example, devices involved in online transactions can be placed in one zone while devices associated with backing up user data can be placed in another zone. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

Recently, new technology referred to as Virtual SANs or VSANs have been implemented in order to enhance fabric scalability and availability, and further augment the security services offered by fabric zoning. VSANs combined with hardware-enforced zoning provide the SAN designer with new tools to highly optimize SAN deployments in terms of scalability, availability, security and management. VSANs provide the ability to create completely isolated fabric topologies, each with its own set of fabric services, on top of a scalable common physical infrastructure. As each VSAN possesses its own zoning service, zoning is then configured within each VSAN independently and has no affect on any other VSAN and zoning service.

Although SANs are able to provide block level access to data storage, customers typically do not want to install Fibre Channel SANs in each of their branches and stores because such systems tend to be too expensive to purchase and manage at the individual branch/store level. Rather, most customers having multiple branch/store locations utilize a remote, centralized block storage facility which is accessible via a wide area network. However, as mentioned previously, there are currently no mechanisms available which allow for the consolidating of block level accesses to a centralized block storage data center. As a result, all read/write block level access requests initiated at a local area network (e.g., at a particular branch/store location) are forwarded over the WAN to the remote block storage facility, whereupon the requests are processed, and appropriate responses (which may include requested block data) are then transmitted from the remote storage over the WAN to the appropriate device (s) residing on the local area network.

It will be appreciated that, one of the disadvantages of using a remote, centralized block storage data center is that, typically, the data stored in the block storage data center is only accessible when the data center is on-line. In other words, conventional techniques do not provide a mechanism for enabling off-line access to remote block storage devices. Additionally, another disadvantage of using a remote block storage data center is that it typically involves a relatively high degree of access latency since the block data must be accessed at a remote location via a WAN (rather than being accessed from a local device residing on the LAN).

According to a specific embodiment of the present invention, consolidation of block storage may be achieved by implementing a block cache at one or more LANs. For example, in one implementation the block cache may be implemented at a WAFS Edge device, as shown, for example, in FIG. 1 of the drawings.

FIG. 1 shows a block diagram of a network portion 100 which may be used for illustrating various aspects of the present invention. In the example of FIG. 1, hosts 102a and 102b may correspond to customer computer systems which are connected via a local area network (LAN 110). The LAN 110 is connected to an edge device 106. In one implementation, the edge device 106 may correspond to a WAFS Edge File Engine (FE) configured or designed to consolidate file level access via CIFS and/or NFS to a centralized Filer Storage 152. In an alternate implementation, edge device 106 may correspond to a traffic handling device such as, for example, a router or switch which, for example, may be configured or designed to access block cache mechanism 108.

Additionally, as shown in FIG. 1 the edge device 106 may include a block cache mechanism 108, which, for example, may be internal or externally attached. In at least one implementation, the block cache mechanism 108 may be configured or designed to cache block level data using a variety of different block storage protocols such as, for example, iSCSI, SCSI, ATA, SAS/SATA, IDE, etc. Additionally, in at least one implementation the block cache mechanism 108 may be configured or designed to consolidate block level access to a remote block storage data center 140.

According to a specific embodiment, host applications which desire access to the remote block storage data center 140 may access the remote block storage data center by establishing block level protocol sessions (e.g., using block level access protocols such as, for example, iSCSI, SCSI, ATA, SATA, IDE, etc.) with virtual targets provided by the edge device 106. The Edge device 106 would then open one or more block level protocol sessions on the backend to the core device at the data center 140 over the WAN 120. In at least one implementation, the block level information sent over the WAN may be encapsulated for data integrity (using, for example, an IPsec protocol).

In a preferred embodiment, the core block storage device functionality may be provided by an IP Storage (IPS) blade or line card of a device configured or designed to support block level access functionality. An example of such a device is a Multi-layer Data Switch ("MDS"), manufactured by Cisco Systems, Inc. In one implementation, the MDS switch may be configured as the front end of the remote block storage data center, with the block storage behind it. According to at least one implementation, the block cache 108 may have the effect of reducing per-host traffic through the IPS line card. Additionally, block storage accessed in this manner would allow the customer to take full advantage of features offered by an MDS SAN including, for example, VSANs, iSCSI virtual targets, etc.

According to different embodiments of the present invention, a variety of different caching models may be used for implementing the block level access consolidation technique of the present invention such as, for example, a Partial Local Caching model and a Full Local Caching model.

In the Partial Local Caching model, the cache may be configured or designed to cache selected portions of block data such as, for example, the most recently used and/or most often used data blocks. For example, in one implementation, the Partial Local Caching model may be configured or designed to perform reading ahead and/or data snooping operations to detect relatively highly used file systems. This information may then be used to optimize selection of the data blocks to be cached.

According to a specific implementation of the Partial Local Caching model, read requests for data blocks which are not currently cached in the block cache may be forwarded to the remote block storage 140. Additionally, the processing of block level write operations may be configured or designed to be user selectable as either write-through or write-back. For example, when configured in write-through mode, block level write requests which are processed would not be confirmed until the block data has been stored in the remote block storage facility 140. Alternatively, when configured in write-back mode, block level write requests which are processed locally would be confirmed once the block data has been cached in the block cache 108. It will be appreciated that the write-back configuration reduces the amount of delay associated with confirmation of the write request.

In the Full Local Caching model, the block cache 108 may be configured or designed to include an entire copy or substantially complete copy of the block data stored at the remote block storage facility 140. This allows critical applications to run and access desired block data even during times when data from the remote block storage facility is unavailable (such as, for example, when the WAN is in a disconnected state). It will be appreciated that the Full Local Caching model offers better performance than the Partial Local Caching model, but would require more storage space on the edge device 106. The Partial Local Caching model provides a lower cost solution (requiring less cache) than the Full Local Caching model. For increased performance and availability of the off-line access capability, write-back processing may be implemented.

According to a specific embodiment, selection of either of the above-described caching models may be based at least partially on customer needs. Additionally, in at least one implementation, different caching models may be selectively implemented on a per volume basis.

Figures 4, 9:
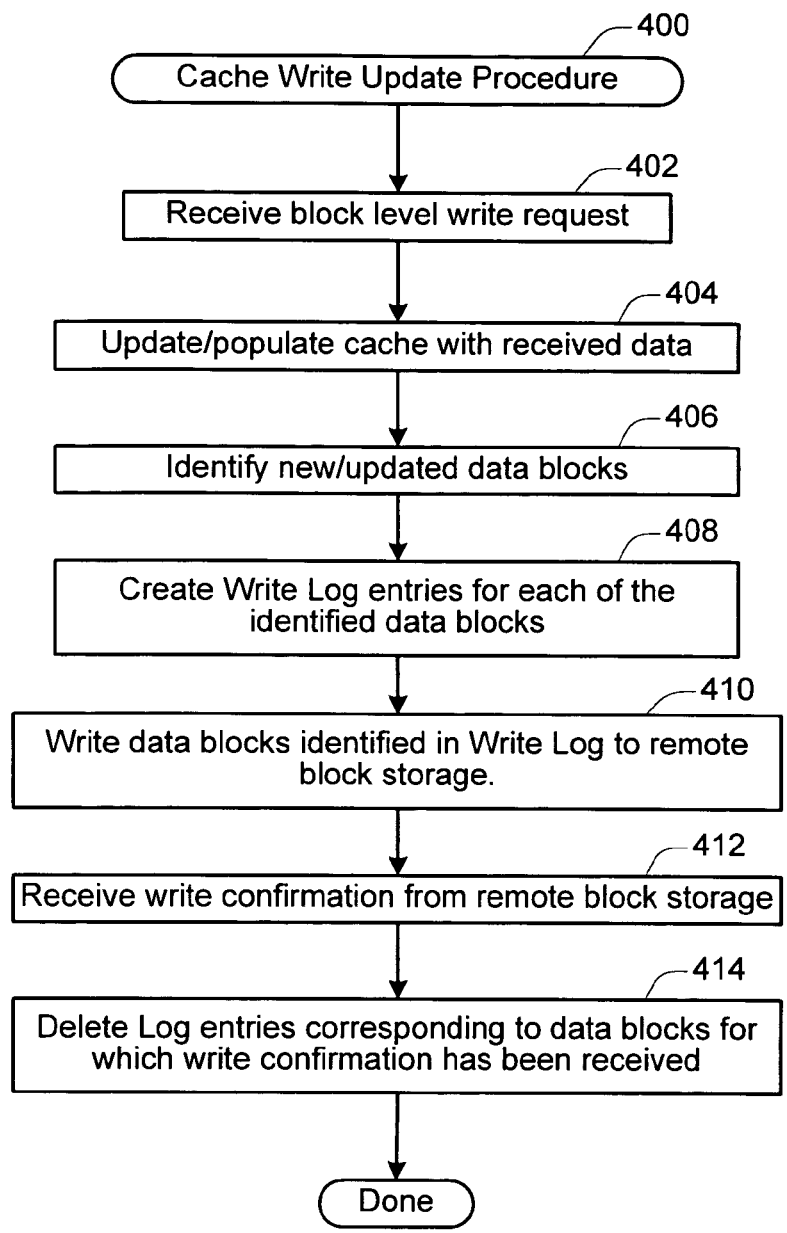
FIGS. 4 and 5 illustrate examples of various block level access flows which may be used for implementing aspects of the present invention.
FIG. 9 shows an example of a Write Log entry portion 900 in accordance with a specific embodiment of the present invention.
Figure 5:
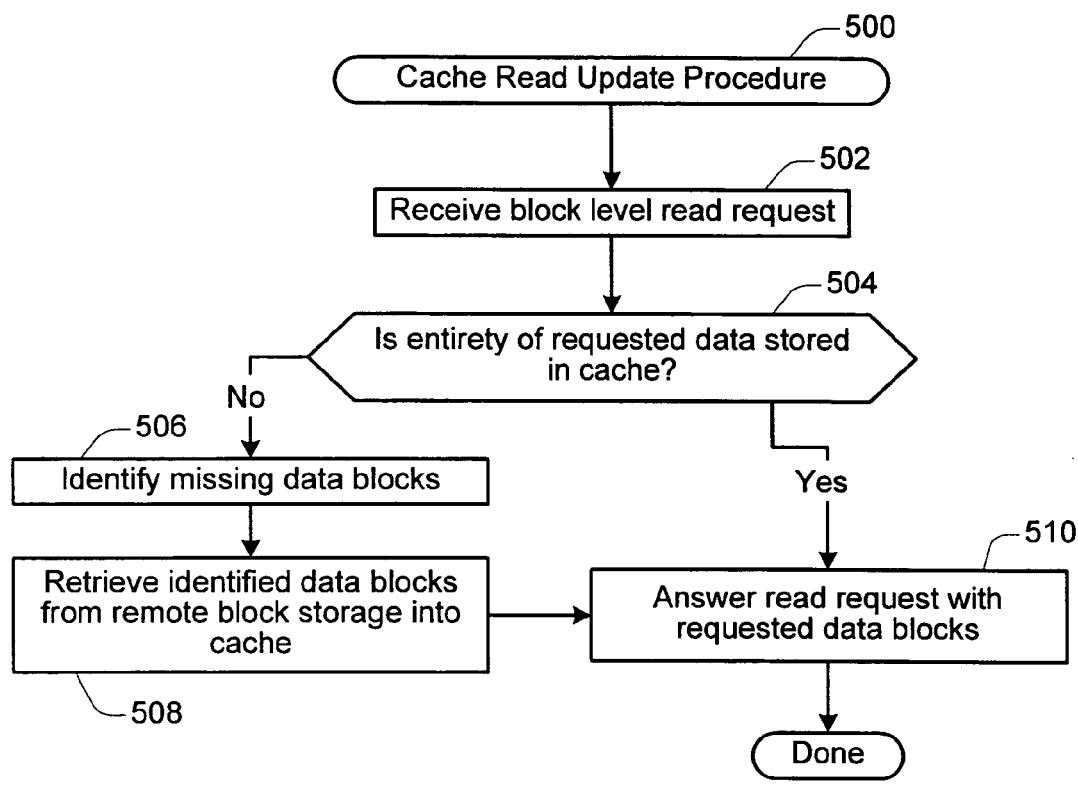

FIGS. 4 and 5 illustrate examples of various block level access flows which may be used for implementing aspects of the present invention. For example, FIG. 4 shows a flow diagram of a Cache Write Update Procedure 400 in accordance with a specific embodiment of the present invention. In at least one implementation, the Cache Write Update Procedure may be implemented at an edge device (e.g., Edge Device A 106) for handling block level write requests from one or more hosts (e.g., Host A, Host B). In at least one implementation, the parameters of the block level write request may include, for example, data (to be written), logical byte address (LBA), number of blocks being written, block size, etc. In specific implementations where the block size value has been predetermined or pre-negotiated (e.g., block size=512 bytes), the write request may omit this parameter. When a block level write request is received (402), the parameters of the write request are used to update (404) or populate the block cache (e.g., 108) with the received data. For example, if it is determined that the blocks to be written already exist in block cache 108, the block data from the write request may be used to update the corresponding blocks in block cache 108. Alternatively, if it is determined that the blocks to be written do not exist in block cache 108, the parameters from the write request may be used to populate the block cache 108 with the desired block data.

According to a specific implementation, when a block level write request is processed from a host on the local network, the block cache may be updated based on the LBA, length (in blocks), and block data received in the write request. If any of the data change in the existing cached blocks, and/or if any new data blocks are added to the cache, the updated/new block data may be identified (406), and a separate Write Log entry may be created (408) for each of the identified new/updated data blocks. An example of a Write Log entry is illustrated in FIG. 9 of the drawings.

In at least one implementation, the edge device (e.g., 106) may be configured or designed to update the remote block storage with new/updated block data (also referred to as "dirty" data) using the information from the Write Log. In one implementation, this may occur automatically and immediately after receiving a write request provided that the WAN is up. If the WAN is not up, the block data write updates may be kept in the Write Log and re-played to the remote block storage after the WAN comes up.

According to at least one embodiment, once the block data has been written to the remote block storage, the remote block storage will respond by providing to the edge device one or more write confirmations for confirming the data blocks which have been written to the remote block storage. Upon receiving (412) the write confirmation(s), the appropriate Write Log entries associated with each of the received write confirmation(s) may be deleted (414) from the Write Log.

FIG. 9 shows an example of a Write Log entry portion 900 in accordance with a specific embodiment of the present invention. According to a specific embodiment, when write-back mode is enabled, a Write Log may be used to keep track of outstanding write operations relating to new and/or updated block data in the block data cache which is to be written to the remote block storage. In one implementation, the Write Log may be stored in local memory at edge device 106 in order to enable local access, and may be used to ensure the remote block storage devices are kept up-to-date even when the WAN connection goes down.

As illustrated in the embodiment of FIG. 9, Write Log entry portion 900 may include a plurality of fields such as, for example, a Target ID field 901; a Logical Unit Number (LUN) field 903; a Logical Block Address (LBA) field 905; a Length field 907 for specifying a number of blocks to be written (as specified, for example, in the associated block level write request); a Task Tag field 909 which may be used for identifying individual write requests or write commands; etc. In one implementation, the Task Tag field may correspond to an Initiator Task Tag in accordance with the iSCSI protocol. According to a specific implementation, a given volume or storage device in the remote block storage facility may be identified by its block level protocol (e.g., iSCSI) Target ID (TID) and Logical Unit Number (LUN) parameters. Logical Blocks in the remote volume may be identified and accessed using the LBA, TID and LUN parameters.

According to one embodiment, if the block level sessions over the WAN are down (offline), Write Log entries which overlap may be merged into single entries. When the sessions are later restored (online), a new write command may then be issued for each entry and the TT field will be updated for the newly issued command.

It will be appreciated that other techniques may be used for updating the remote block storage with a new or updated data from the local block cache. For example, in one implementation, a "dirty data" flag technique may be used for indicating new or updated data in the block cache which needs to be written to the remote block storage. However, one advantage of using the Write Log technique of the present invention is that the Write Log may be used to preserve the order in which block data was written into the block cache.

FIG. 5 shows a flow diagram of a Cache Read Update Procedure 500 in accordance with a specific embodiment of the present invention. In at least one implementation, the Cache Read Update Procedure may be implemented at an edge device (e.g., Edge Device A 106) for handling block level read requests from one or more hosts (e.g., Host A, Host B). In at least one implementation, the parameters of the block level read request may include, for example, logical byte address (LBA), number of blocks being read, block size, etc. When a block level read request is received (502), the parameters of the read request are used to determine (504) whether the entirety of the requested data is stored in the local block cache (e.g., block cache 108). If it is determined that the entirety of the requested data is stored in the local block cache, the read request may be answered (510) or responded to using the appropriate block data cached within the block data cache. However, if it is determined that a portion of the requested data is not stored in the block data cache, the missing data blocks are identified (506), and retrieved (508) from the remote block storage data center (e.g., 140) and cached in the block data cache 108. Thereafter, the read request may be answered (510) or responded to using the appropriate block data cached within the block data cache.

Figure 3A:
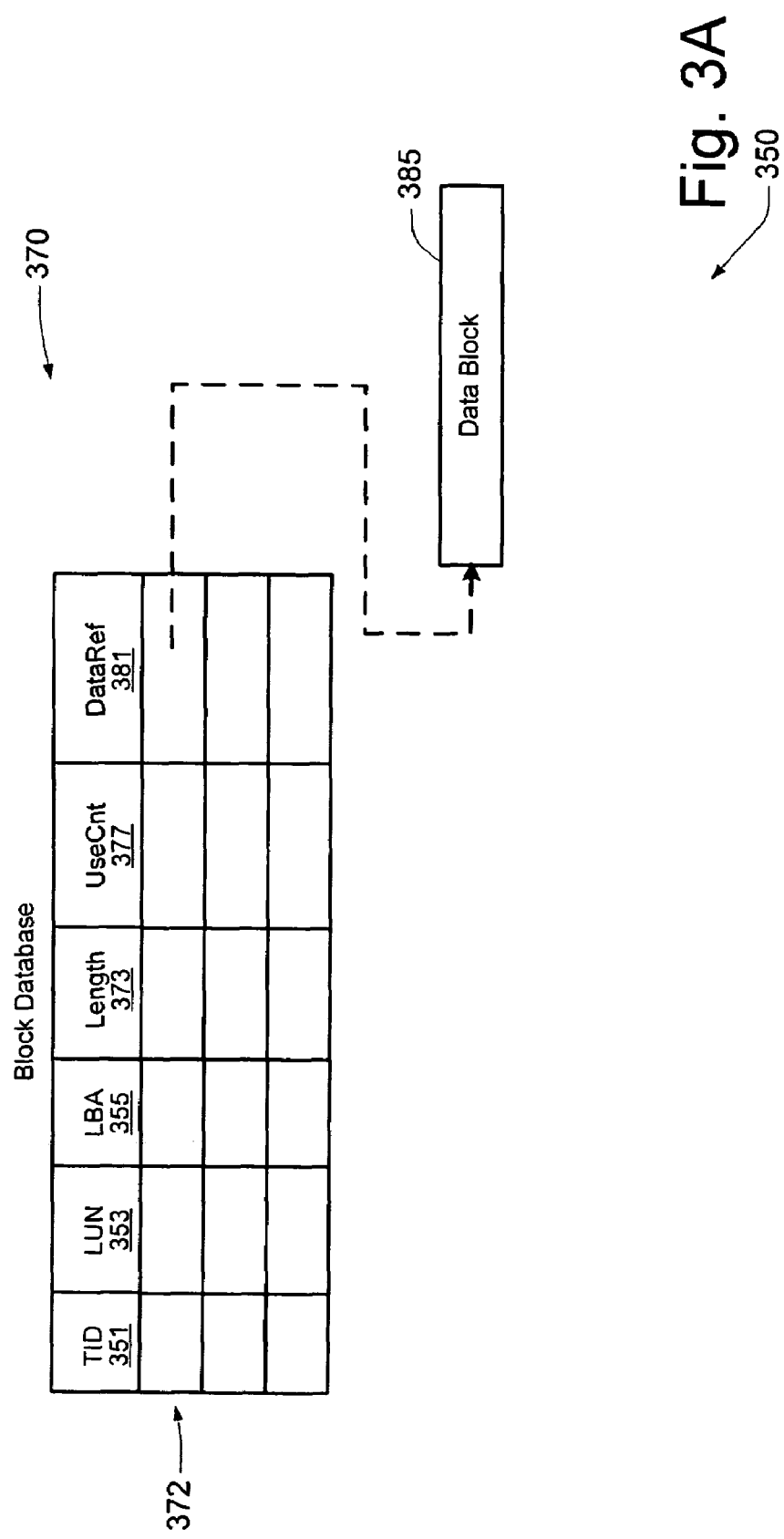
FIG. 3A shows a block diagram of a specific embodiment of block cache portion 350 which may be used for implementing various aspects of the present invention.

FIG. 3A shows a block diagram of a specific embodiment of block cache portion 350 which may be used for implementing various aspects of the present invention. In at least one implementation, block cache portion 350 may be used for implementing block cache 108 of FIG. 1.

As illustrated in the embodiment of FIG. 3A, block cache portion 350 may be implemented using a Block Database 370. According to a specific implementation, the Block Database 370 may be configured or designed to preserve the ordering of the block data as laid out in the remote block storage. In one implementation, this ordering may be based on the Logical Block Address (LBA) for a device identified by its block level protocol (e.g., iSCSI) Target ID (TID) 351 and Logical Unit Number (LUN) 353 parameters.

In the example of FIG. 3A, each entry (e.g., 372) in the block database 370 may correspond to a different data block. Each data block may have different parameter values associated therewith. Thus, each entry in the block database 370 may include a plurality of different fields relating to the various data block parameters including, for example: a Target ID field 351; a Logical Unit Number (LUN) field 353; a Logical Block Address (LBA) field 355; a Length field 373 for specifying the number of blocks contained in the associated data block; a Usage Count (UseCnt) field 377; a Data Block Reference (DataRef) field 381 which may include a pointer or other reference information for locating or identifying the Data Block (e.g., data block 385) associated with that entry; etc. According to a at least one implementation, the Block Database 370 and associated data blocks may be cached in local memory which may reside, for example, at block cache 108 and/or at Edge Device 106.

According to at least one implementation, entries in the Block Database may be aged using the UseCnt field 377. For example, in one implementation where the Partial Local Caching mode is implemented, when an entry is used or accessed, it may be freshened by incrementing the UseCnt field by a predetermined value. A timer may be used to decrement the UseCnt periodically to age the entries. Entries may be purged from the Block Database when the database grows to a given percentage of the total space allocated for the cache.

According to different embodiments, the layout of the block cache of the present invention may be configured or designed to optimize the local cache storage space and/or to provide for data suppression via block level access protocols. For example, in at least one implementation the block cache layout may be configured or designed to take advantage of various data suppression techniques. In one data suppression technique, sequential block data may be divided into chunks using boundaries chosen by specifically selected fingerprints using a technique such as, for example, the Rabin fingerprint technique. An example of a Rabin fingerprint technique is described in the reference document entitled, "*A Low-bandwidth Network File System*," by Athicha Muthitacharoen, Benjie Chen, and David Mazieres, Proceedings of the 18th ACM Symposium on Operating Systems Principles, pages 174-187, Chateau Lake Louise, Banff, Canada, October 2001, incorporated herein in its entirety for all purposes.

Once the block data has been divided into chunks, a respective hash value or hash ID may be computed (using, for example, well know hash algorithms such as MD5 and/or SHA-1) for each chunk. The hash ID provides a unique identifier for the data contained in its associated chunk. Redundant data may then be suppressed by using the hash value to refer to the data rather than the raw data itself.

Figure 3B:
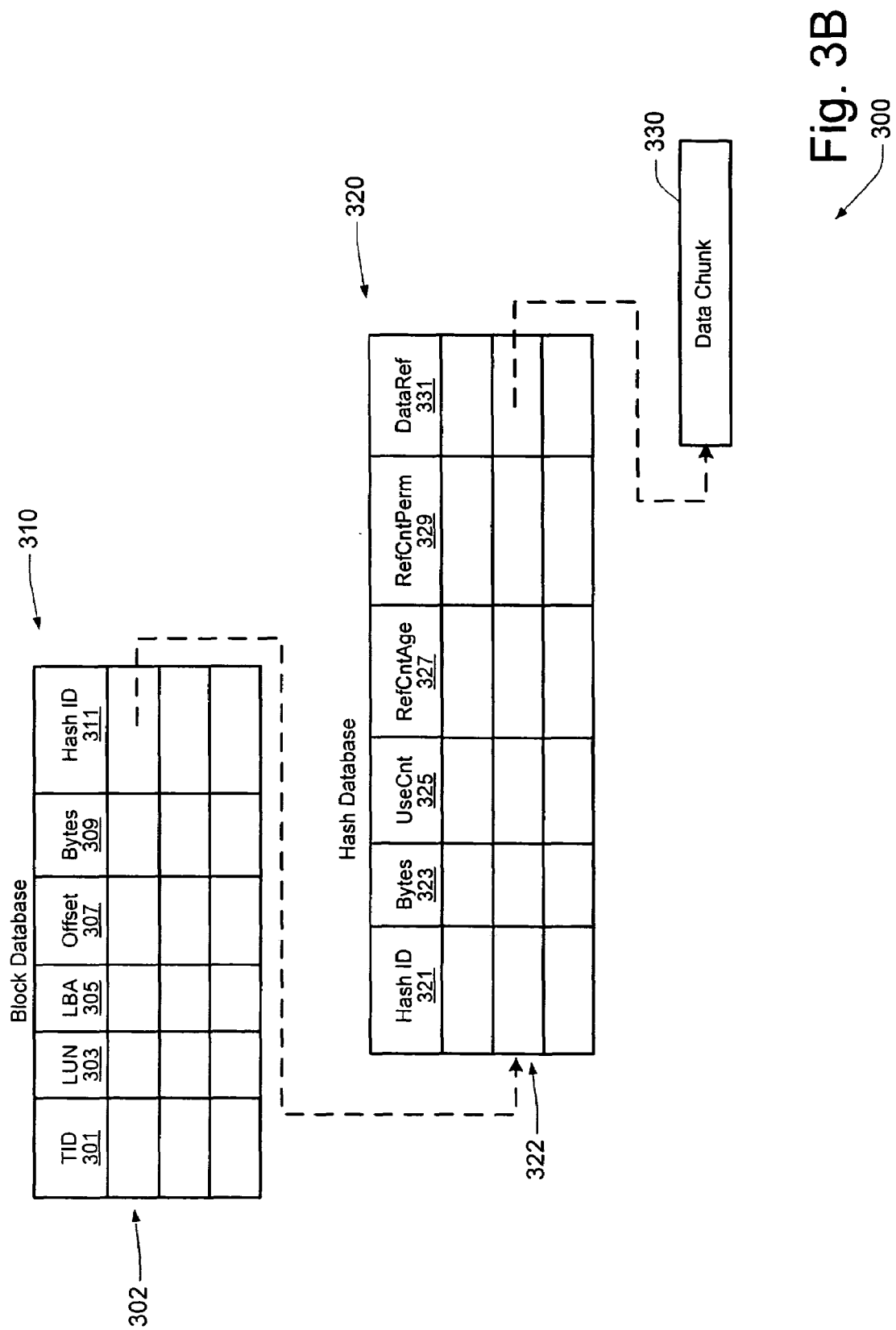
FIG. 3B shows a block diagram of a specific embodiment of block cache portion 300 which may be used for implementing various aspects of the present invention.

FIG. 3B shows a block diagram of a specific embodiment of block cache portion 300 which may be used for implementing various aspects of the present invention. As illustrated in the embodiment of FIG. 3B, the block cache portion 300 may be implemented using two databases, namely Block Database 310 and Hash Database 320. According to a specific implementation, the Block Database 310 may be configured or designed to preserve the ordering of the data chunks (represented by hash values) as laid out in the remote block storage. In one implementation, this ordering may be based on the Logical Block Address (LBA) for a device identified by its block level protocol (e.g., iSCSI) Target ID (TID) 301 and Logical Unit Number (LUN) 303 parameters.

In the example of FIG. 3B, each entry (e.g., 302) in the Block Database 310 may correspond to a different data chunk. Each data chunk may have different parameter values associated therewith. Thus, each entry (e.g., 302) in the Block Database 310 may include a plurality of different fields relating to the various data chunk parameters including, for example: a Target ID field 301; a Logical Unit Number (LUN) field 303; a Logical Block Address (LBA) field 305; an Offset field 307 which may be used to indicate the number of bytes into the first block (referred to by the LBA field) where the data for the chunk begins; a Bytes field 309 which may specify the number of bytes of the associated data chunk; and a Hash ID field 311 which includes a Hash ID value for uniquely identifying the associated data chunk.

According to a specific embodiment, the Block Database may be used to find cached data to satisfy local READ operations. For example, the Block Database may be searched for entries that contain the blocks identified by the READ request. The data may be retrieved from the Hash Database using the hash index contained in the entries. Data that is not present in the cache may be read from the remote block storage.

According to at least one embodiment, the Hash Database 320 may be configured or designed to include a mapping of the computed Hash ID values to their associated raw data chunks 330. The raw data chunks 330 may be cached in local memory either in uncompressed format or compressed format, depending upon user preferences and/or available cache storage space. In one implementation, the Hash Database 320 may also be used by other applications (e.g., the CIFS cache) to store other data indexed by the Hash ID values.

As illustrated in the embodiment of FIG. 3B, each entry (e.g., 322) in the Hash Database 320 may be mapped to a different data chunk 330. Accordingly, each entry Hash Database 320 may include a plurality of different fields relating to its associated data chunk parameters including, for example: a Hash ID field 321; a Bytes field 323 which may specify the number of bytes of the associated data chunk; a Use Count (UseCnt) field 325; a Reference Count Age (RefCntAge) field 327; a Reference Count Permanent (RefCntPerm) field 329; a Data Block Reference (DataRef) field 331 which may include a pointer or other reference information for locating or identifying the Data Block (e.g., data block 330) associated with that entry; etc. According to different embodiments, the DataRef value may correspond to the LBA of a disk or filename, or may correspond to other reference identifiers for identifying data associated with block storage, file storage, database storage, etc.

According to a specific embodiment, entries in the Hash Database may be aged using the UseCnt field 325. For example, when an entry is used, it may be freshened by incrementing the UseCnt field by a predetermined value. A timer may be used to decrement the UseCnt periodically to age the entries. Entries may be purged from the Hash Database when the database grows to a given percentage of the total space allocated for the cache. In one implementation, the selection of which entries to purge may be determined via the UseCnt, RefCntAge, and/or RefCntPerm fields. For example, in one implementation, the RefCntAge field for a given entry may be configured or designed to store the count of Block Database (or other database) entries which have a reference to that entry. This feature may be particularly useful in embodiments where the Partial Local Caching model is implemented because it allows for selected entries to be purged based on age and cache limits, for example. In other embodiments where the Full Local Caching model is implemented, the RefCntPerm field 329 for a given entry may be configured or designed to store the count of Block Database (or other database) entries which have a reference to that entry, and used to prevent the purging of that entry based on age. Thus, for example, according to one implementation, a block database entry with a non-zero RefCntPerm field value cannot be removed.

In at least one implementation, Block Database entries may be removed as their corresponding entries in the Hash Database are aged out. This could be done, for example, using a timer to periodically check for stale entries. In this case, entries in the Block Database (or other databases) would remain for some time period after the hash entries had been removed. According to one implementation, if one of these entries were hit while attempting to complete a read request, the entry may be removed if the associated Hash ID entry was not found.

Figure 6:
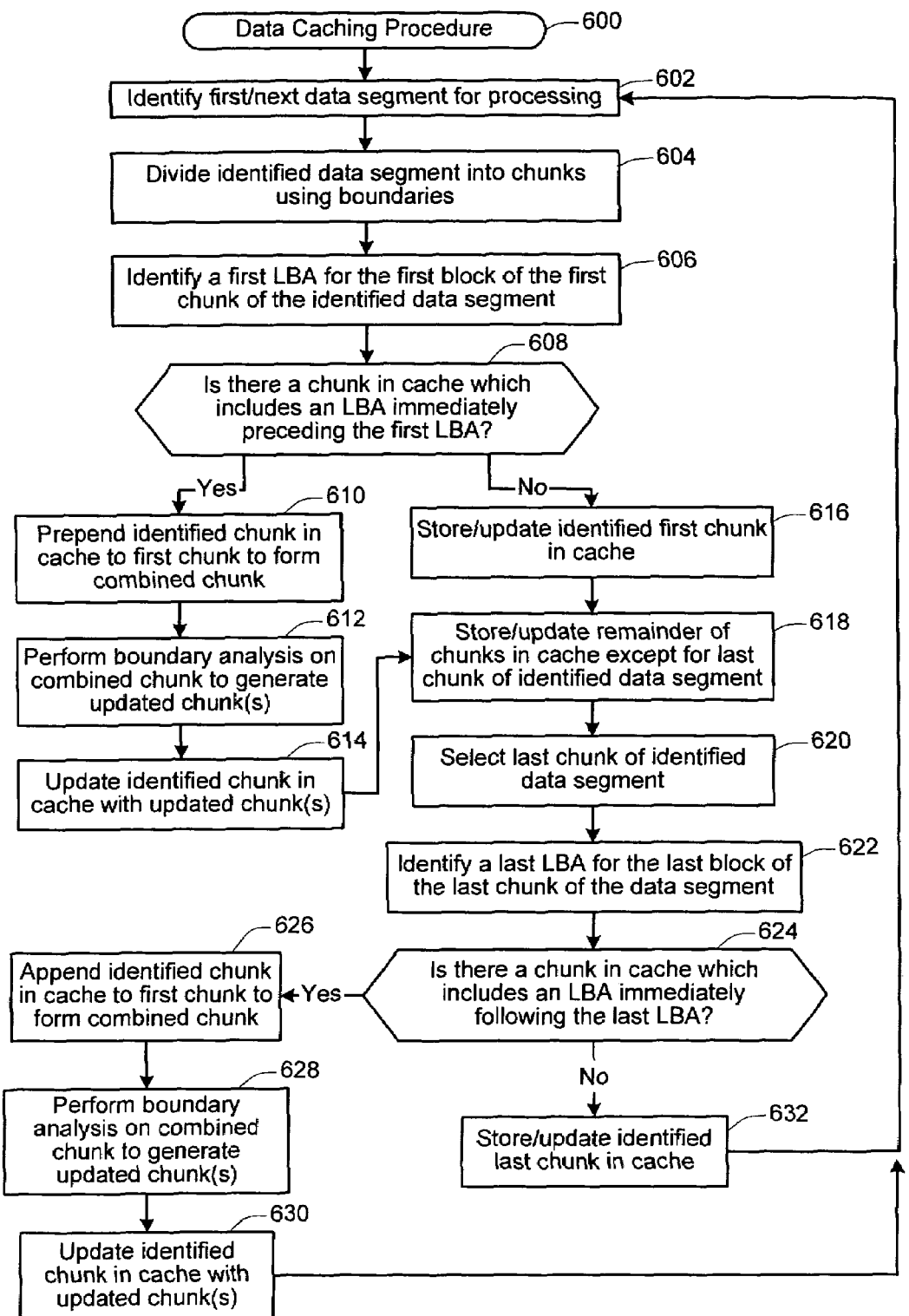
FIG. 6 shows a flow diagram of a Data Caching Procedure 600 in accordance with a specific embodiment of the present invention.

FIG. 6 shows a flow diagram of a Data Caching Procedure 600 in accordance with a specific embodiment of the present invention. In at least one embodiment, the Data Caching Procedure 600 of FIG. 6 may be implemented in situations where the layout of the block cache 108 has been configured or designed to optimize the local cache storage space and/or to provide for data suppression via block level access protocols, as illustrated, for example, in FIG. 3B of the drawings.

For purposes of illustration, the Data Caching Procedure of FIG. 6 will be described by way of example with reference to FIGS. 7 and 8 of the drawings. In this example, it is assumed that one or more data segments are being provided to edge node 106 (via block level read and/or block level write operations) for caching at the block cache 108.

As the data segments are received, a first data segment is identified (602) and selected for processing. The identified data segment is then divided (604) into chunks using boundary information. According to a specific embodiment, an algorithm such as, for example, the Rabin Fingerprint algorithm, may be used to determine the chunk boundaries. For example, in one implementation, fingerprints may be identified and selected when a desired number of the least significant bits in the fingerprint are all zero. This number of bits may be represented by the symbol $\gamma$. In at least one implementation, the expected chunk size may be represented as $2^\gamma$ (for example, a $\gamma$ of 13 yields an expected chunk size of 8KB). Additionally, in at least one implementation, fingerprints may be computed on each byte using an n-byte sliding window (e.g., n=48). In one embodiment, selected fingerprints that produce a chunk size less than the block size (e.g., block size =512 bytes) may be ignored, and chunks may be limited to a maximum size such as, for example, 64 KB.

Figure 7:
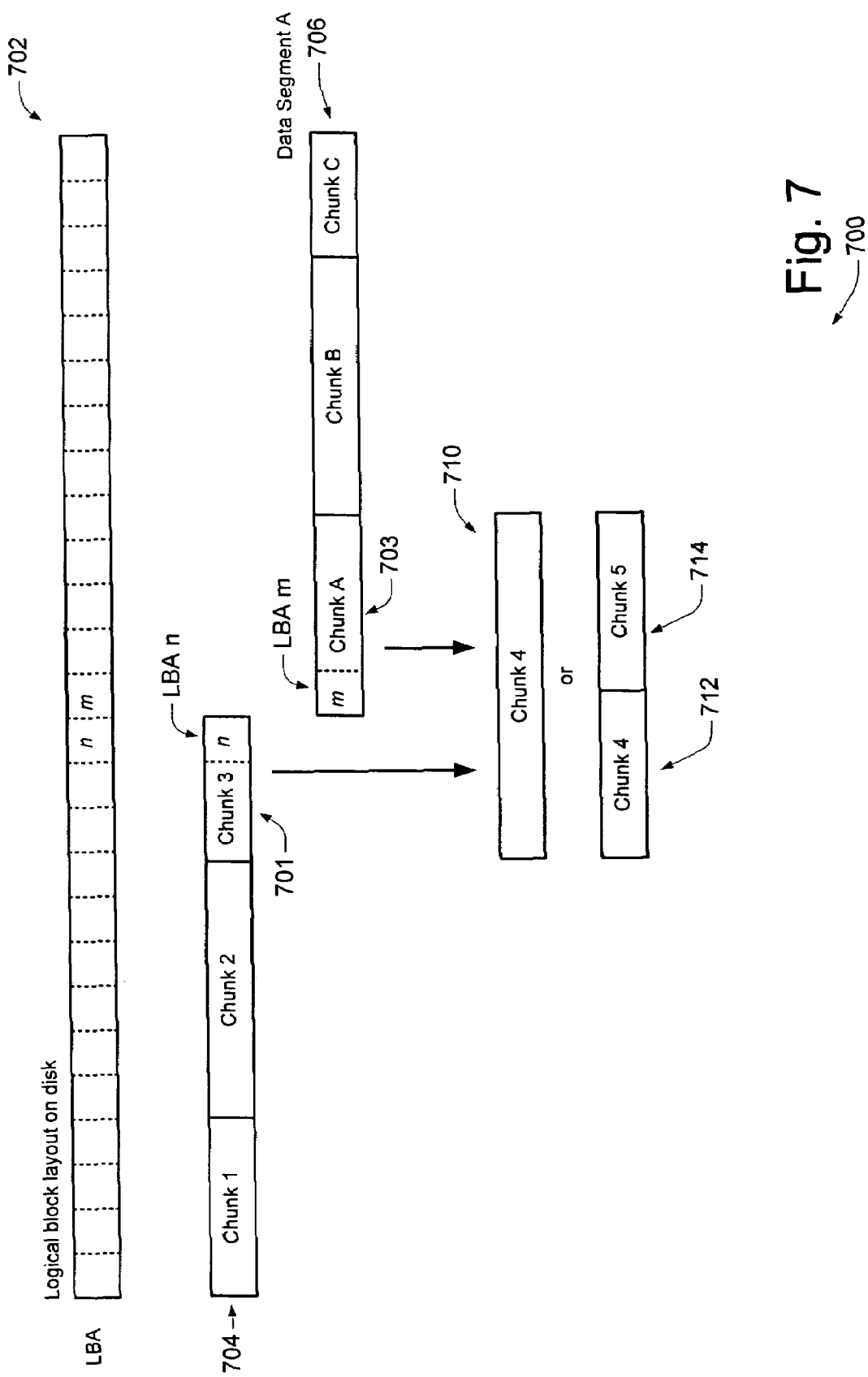

FIG. 7 shows an example of one technique of the present invention which may be used for separating or dividing data segments into chunks. In the example of FIG. 7, it is assumed that Data Segment A 706 has been selected for processing by the Data Caching Procedure 600, and that three different chunks (e.g., Chunk A, Chunk B, Chunk C) have been identified in Data Segment A using, for example, the Rabin Fingerprint technique.

Typically, when trying to preserve the ordering of block data using the Rabin Fingerprint technique, special attention should preferably be given to the segment boundaries. According to a specific embodiment, it may be preferable for the sliding window to begin on the first sequential byte following the previous chunk (e.g., the point at which a fingerprint was computed which matched the selection criteria). This may be desirable in order to maximize hash matches in the database.

In order to allow the sliding window to begin on the first sequential byte following the previous chunk, the portion of the previous chunk stored in cache which immediately precedes the start of the data segment may be retrieved and pre-pended to the first chunk of the current data segment. Beginning from this point a next chunk may be determined. According to a specific implementation, if the cache does not include a chunk which immediately precedes the data segment, the sliding window may begin at the first byte of the segment.

Similarly, if available, data from the cached chunk which immediately follows the last block of the received segment may be retrieved from the cache and appended to the data to compute the last chunk. If the next sequential chunk is not available in the cache, the last chunk may be terminated at the end of the segment, regardless of fingerprint. Additionally, according to one implementation, if a fingerprint is selected within the last block of the data segment (with no additional data available), the fingerprint may be ignored and the chunk may be extended to the end of the block.

Thus, for example, a first LBA for the first block of the first chunk of the identified a data segment may be identified (606), and a determination may be made (608) as to whether there exists a chunk in the cache which includes an LBA immediately preceding the first LBA identified from the data segment.

In the example of FIG. 7, it is assumed that the first LBA for the first block of the first chunk of the data segment corresponds to LBA m of Chunk A 703. Using this information, Chunk 3 701 of the cache may be identified as including an LBA (i.e., LBA n) which immediately precedes LBA m. According to a specific implementation, the terms "immediately preceding" or "immediately following" may refer to sequentially consecutive logical blocks in the logical block layout (e.g., 702) which are logically adjacent to a specified logical block.

If it is determined that a chunk does not exist in the cache which includes an LBA immediately preceding the first LBA, then the identified first chunk (e.g., Chunk A) may be cached (616) in the block cache to thereby update/populate the cache with block data from the first chunk. If, on the other hand, it is determined that a chunk does exist in the cache which includes an LBA immediately preceding the first LBA, then the identified chunk in the cache is prepended (610) to the first chunk of the data segment to form a combined chunk. Thus, for example, as illustrated in FIG. 7, Chunk 3 701 is prepended to Chunk A 703 to form a combined chunk 710. Boundary analysis may then be performed (612) on the combined chunk in order to generate one or more updated chunk(s). For example, as illustrated in FIG. 7, the boundary analysis performed on the combined chunk 710 may yield a single updated chunk (e.g., Chunk 4), or may yield multiple updated chunks (e.g., Chunk 4, Chunk 5).

After the boundary analysis has been performed on the combined chunk, the updated chunk(s) may be cached (614) into the block cache. For example, if the boundary analysis on the combined chunk 710 results in a single updated chunk (e.g., Chunk 4), then Chunk 3 may be removed from the Hash Database and Chunk 4 may be added to the Hash Database. Additionally, the Block Database entry referring to Chunk 3 may be modified to reference the larger Chunk 4. Alternatively, if the boundary analysis on the combined chunk 710 results in two updated chunks (e.g., Chunk 4 and Chunk 5), then Chunk 3 may be removed from the Hash Database and Chunks 4 and 5 may be added to the Hash Database. Additionally, the Block Database entry referring to Chunk 3 may be modified to reference Chunk 4, and a new entry may be added to the Block Database for Chunk 5.

Thereafter, the remainder of the chunks identified in the selected data segment may be cached (618) in the block cache, except for the last chunk of the selected data segment. Thus, in the example of FIG. 7, Chunk B of Data Segment A would be cached in the block cache. However, as explained in greater detail below, Chunk C of Data Segment A would be selected (620) for further analysis.

FIG. 8 shows an example of a technique of the present invention which may be used for separating or dividing data segments into chunks. It can be seen that the example of FIG. 8 is similar to that of FIG. 7, however, for purposes of illustration, the example of FIG. 7 is used to illustrate how the beginning portion of a data segment may be processed, whereas the example of FIG. 8 is used to illustrate how the end portion of a data segment may be processed. In the example of FIG. 8, it is assumed that Data Segment A 706 has been selected for processing by the Data Caching Procedure 600, and that three different chunks (e.g., Chunk A, Chunk B, Chunk C) have been identified in Data Segment A using, for example, the Rabin Fingerprint technique.

As illustrated in FIG. 6, a last LBA for the last block of the last chunk of the identified data segment may be selected (622) for analysis, and a determination made (624) as to whether there exists a chunk in the cache which includes an LBA immediately following the last LBA identified from the data segment.

In the example of FIG. 8, it is assumed that the last LBA of the last block of the last chunk of the identified data segment corresponds to LBA s of Chunk C of Data Segment A. Using this information, Chunk F 803 of the cache may be identified as including an LBA (i.e., LBA t) which immediately follows LBA s.

If it is determined that a chunk does not exist in the cache which includes an LBA immediately following the last LBA, then the identified last chunk (e.g., Chunk C) may be cached (632) in the block cache to thereby update/populate the cache with block data from the last chunk. If, on the other hand, it is determined that a chunk does exist in the cache which includes an LBA immediately following the last LBA, then the identified chunk in the cache is appended or postpended (626) to the last chunk of the data segment to form a combined chunk. Thus, for example, as illustrated in FIG. 8, Chunk F 803 is appended to Chunk C 801 to form a combined chunk 810. Boundary analysis may then be performed (628) on the combined chunk in order to generate one or more updated chunk(s). For example, as illustrated in FIG. 8, the boundary analysis performed on the combined chunk 810 may yield a single updated chunk (e.g., Chunk D), or may yield multiple updated chunks (e.g., Chunk D, Chunk E).

After the boundary analysis has been performed on the combined chunk, the updated chunk(s) may be cached (630) into the block cache. For example, if the boundary analysis on the combined chunk 810 results in a single updated chunk (e.g., Chunk D), then Chunk F may be removed from the Hash Database and Chunk D may be added to the Hash Database. Additionally, the Block Database entry referring to Chunk F may be modified to reference the larger Chunk D. Alternatively, if the boundary analysis on the combined chunk 810 results in two updated chunks (e.g., Chunk D and Chunk E), then Chunk F may be removed from the Hash Database and Chunks D and E may be added to the Hash Database. Additionally, the Block Database entry referring to Chunk F may be modified to reference Chunk D, and a new entry may be added to the Block Database for Chunk E. After the identified data segment has been processed into appropriate chunks, and the chunks have been cached into the block cache, a next data segment may then be selected (602) for analysis.

According to a specific embodiment, when a chunk is selected for processing, a hash value or Hash ID may be computed for the selected chunk. In one implementation, the hash value may be computed incrementally as the fingerprint selection is being performed. The Hash Database may then be searched for a match on the Hash ID. If a match is not found, an entry for the Hash ID may be inserted into the Hash Database, and the associated data chunk may be stored. If a matching Hash ID entry is found, the identified entry in the cache will simply be freshened. According to one implementation, the matching entry in the Hash Database should also have a matching byte count value.

According to specific embodiments, the Block Database may be also searched for an LBA entry (or entries) overlapping the LBA range of a newly identified data chunk. If an exact entry for the chunk already exists with a matching Hash ID, the original entry may be left intact and the next chunk computed. If an overlap is found that does not match, the entries in the Block Database may be modified so that the chunk can be added as a single entry to the Block Database. In at least one implementation, entries may be added in ascending order based, for example, on the Target ID, LUN, and LBA fields. In one implementation, the offset field may be used to indicate the number of bytes into the first block (e.g., referred to by the LBA field) where the data for the chunk begins.

Figure 2:
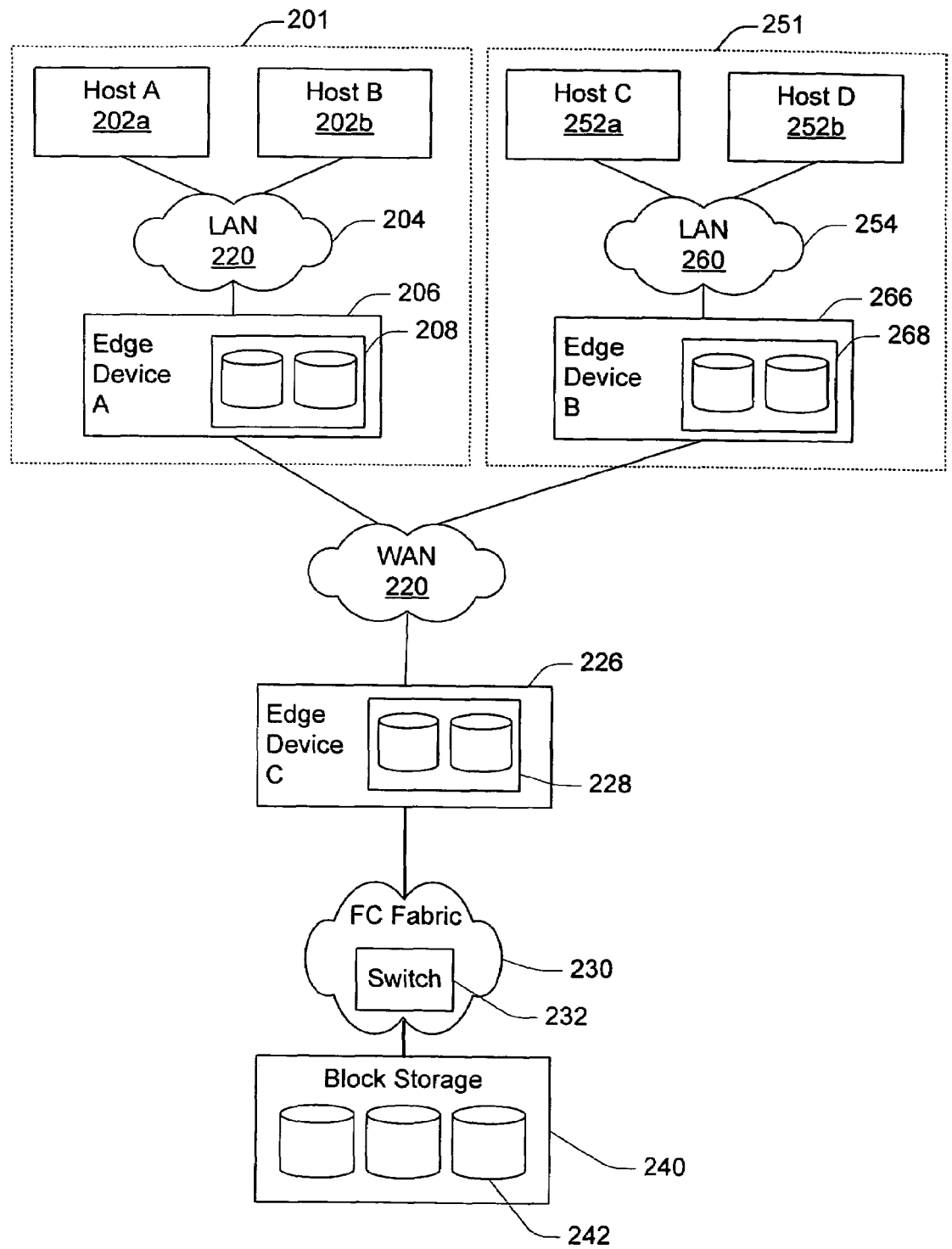
FIG. 2 shows a block diagram of an alternate embodiment of a network portion 200 which may be used for illustrating various aspects of the present invention.

FIG. 2 shows a block diagram of an alternate embodiment of a network portion 200 which may be used for illustrating various aspects of the present invention. In the example of FIG. 2, consolidation of block data from different LANs (e.g., 220, 260) may be achieved using a plurality of block cache mechanisms. For example, as illustrated in the example of FIG. 2, each LAN may include a respective block cache 208, 268 similar in functionality to block cache 108 of FIG. 1. Each block cache 208, 268 may be configured or designed to service block level access requests from local hosts to the remote block storage facility 240. Additionally, as illustrated in the embodiment of FIG. 2, network portion 200 may include a WAN-side edge device (e.g., Edge Device C 226) which also includes a block cache 228. According to a specific implementation, block cache 228 may be configured or designed to aggregate block data and/or other block level information from each of the block cache mechanisms 208, 268 associated with the plurality of LANs 220, 260. In at least one implementation, the block cache mechanisms may be configured or designed to perform block level access operations using a variety of different block storage protocols such as, for example, iSCSI, SCSI, ATA, SAS/SATA, IDE, etc.

According to a specific embodiment, host applications which desire access to the remote block storage data center 240 may access the remote block storage data center by establishing block level protocol sessions with virtual targets provided by a local edge device. The local edge devices (e.g., 206, 266) may open one or more block level protocol sessions on the backend to the WAN-side edge device 226, and the WAN-side edge device 226 may open one or more block level protocol sessions to the block storage data center 240 via the FC fabric 230. In at least one implementation, edge device 226 and/or block cache mechanism 228 may be integrated into a switch 232 of the FC fabric.

It will be appreciated that the block storage consolidation technique of the present invention provides a number of benefits over conventional block storage mechanisms. For example, one benefit of the block storage consolidation technique of the present invention relates to the reduction of management costs and overhead. Another benefit relates to the feature of enabling backups to be performed at the remote data center. Yet another benefit relates to the feature of enabling higher-end storage devices to be used and shared amongst the remote sites. Other benefits and advantages which may be realized using the technique of the present invention include: offline access to remote block storage; content-based indexing using block and hash databases; deferment of trace writes when offline, which may be played at a later time to the remote block storage; write log indexes into hash table, which provide for very efficient replay capabilities; etc.

Other Embodiments

Figure 10:
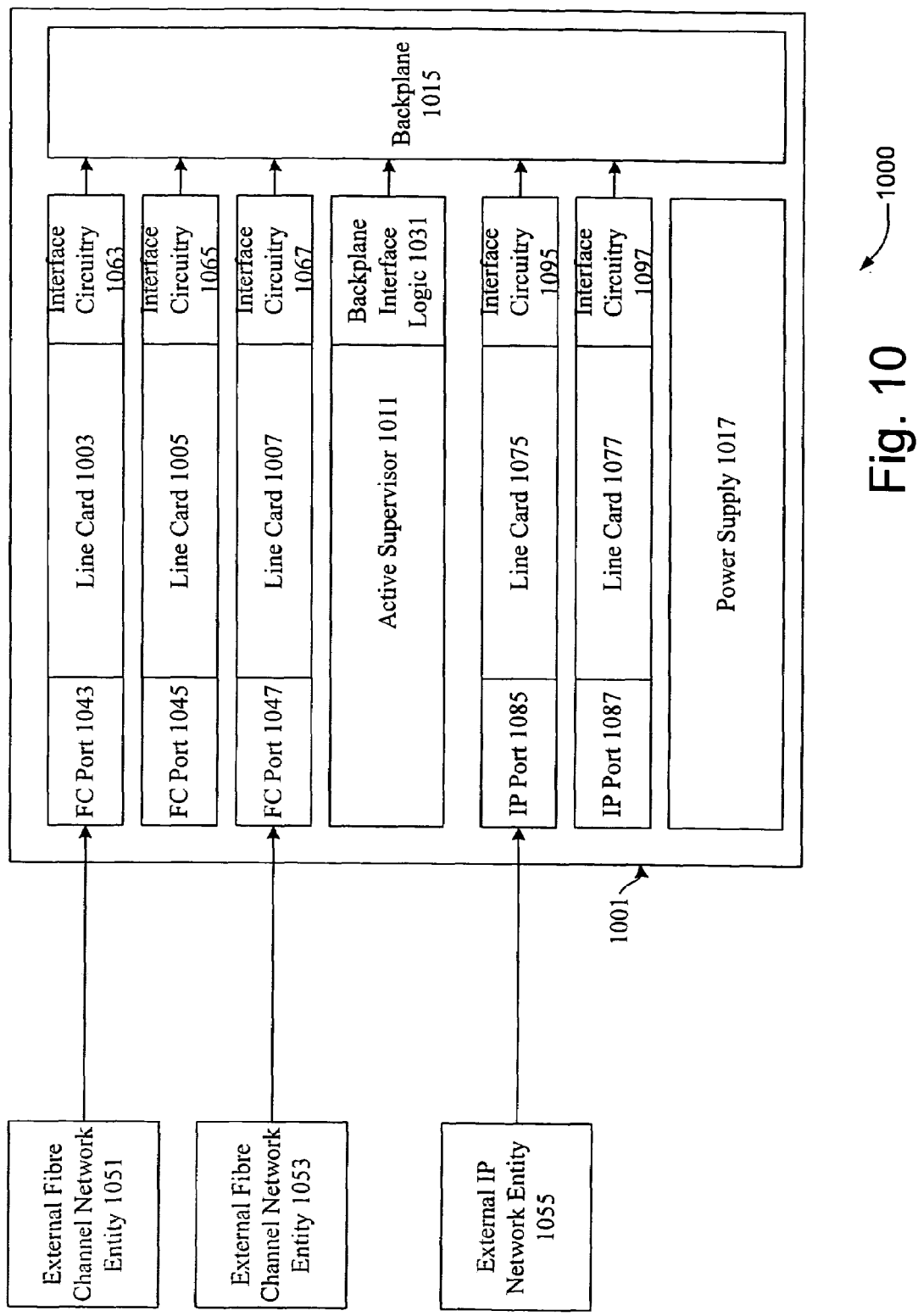
FIG. 10 is a diagrammatic representation of one example of a fibre channel switch that can be used to implement techniques of the present invention.

FIG. 10 is a diagrammatic representation of one example of a fibre channel switch that can be used to implement techniques of the present invention. Although one particular configuration will be described, it should be noted that a wide variety of switch and router configurations are available. The switch 1001 may include one or more supervisors 1011 and power supply 1017. According to various embodiments, the supervisor 1011 has its own processor, memory, and storage resources.

Line cards 1003, 1005, and 1007 can communicate with an active supervisor 1011 through interface circuitry 1063, 1065, and 1067 and the backplane 1015. According to various embodiments, each line card includes a plurality of ports that can act as either input ports or output ports for communication with external fibre channel network entities 1051 and 1053. The backplane 1015 can provide a communications channel for all traffic between line cards and supervisors. Individual line cards 1003 and 1007 can also be coupled to external fibre channel network entities 1051 and 1053 through fibre channel ports 1043 and 1047.

External fibre channel network entities 1051 and 1053 can be nodes such as other fibre channel switches, disks, RAIDS, tape libraries, or servers. The fibre channel switch can also include line cards 1075 and 1077 with IP ports 1085 and 1087. In one example, IP port 1085 is coupled to an external IP network entity 1055. The line cards 1075 and 1077 also have interfaces 1095 and 1097 to the backplane 1015.

It should be noted that the switch can support any number of line cards and supervisors. In the embodiment shown, only a single supervisor is connected to the backplane 1015 and the single supervisor communicates with many different line cards. The active supervisor 1011 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

Figure 11:
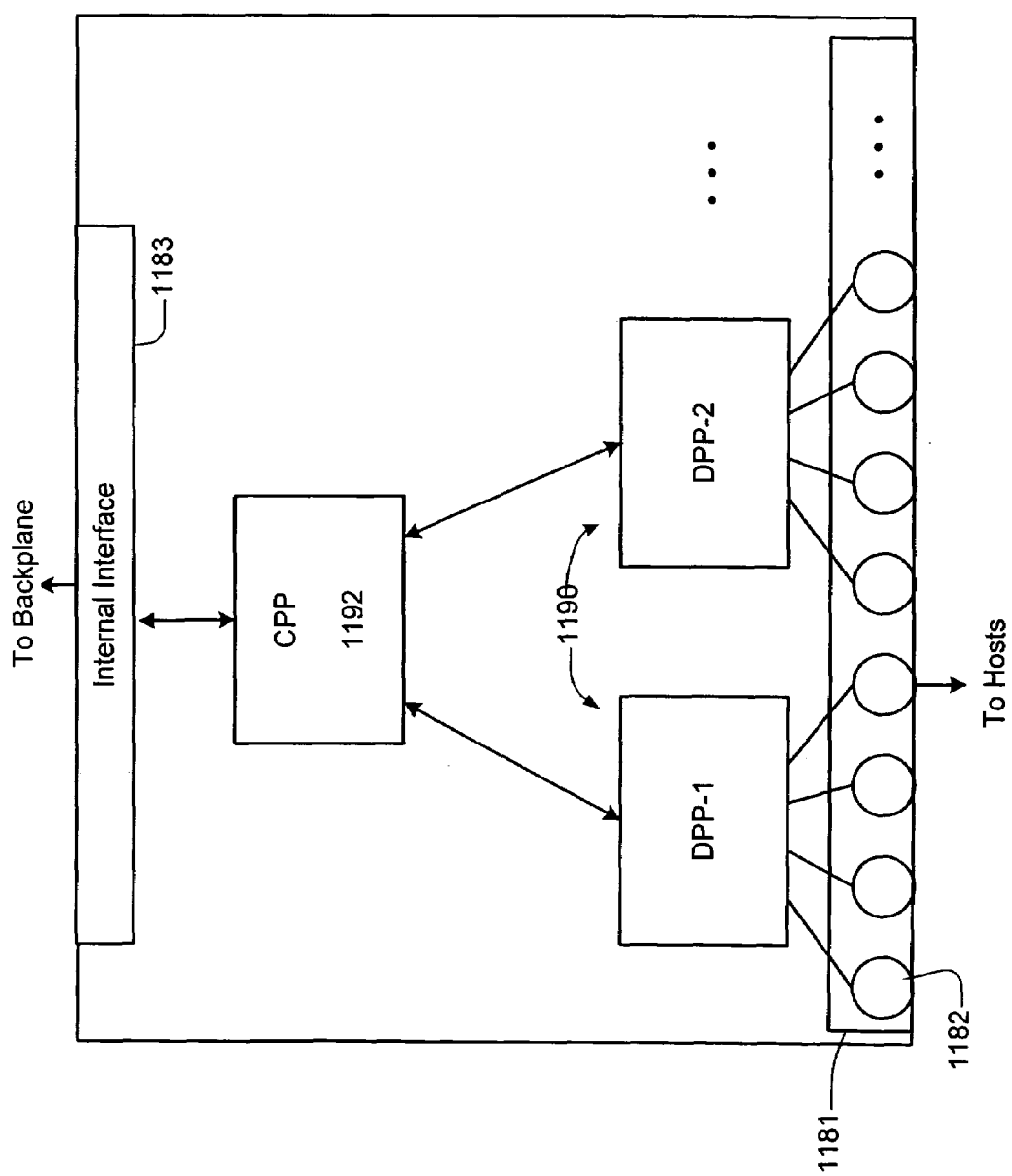
FIG. 11 is a block diagram illustrating a portion of an exemplary virtualization switch or intelligent line card in accordance with a specific embodiment of the present invention.

FIG. 11 is a block diagram illustrating a portion of an exemplary virtualization switch or intelligent line card in accordance with a specific embodiment of the present invention. According to one embodiment, switch portion 1180 of FIG. 11 may be implemented as one of a plurality of line cards residing in a fibre channel switch such as that illustrated in FIG. 10, for example. In at least one implementation, switch portion 1180 may include a plurality of different components such as, for example, at least one external interface 1181, at least one data path processor (DPP) 1190, at least one control path processor (CPP) 1192, at least one internal interface 1183, etc.

As shown in the example of FIG. 11B the external interface of 1181 may include a plurality of ports 1182 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 1182 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 11, switch portion 1180 may also include a control path processor (CPP) 1192 configured or designed to perform control path processing for storage virtualization. In at least one implementation, functions performed by the control path processor may include, for example, calculating or generating virtual-to-physical (V2P) mappings, processing of port login and process login for volumes; hosting iPort VM clients which communicate with volume management (VM) server(s) to get information about the volumes; communicating with name server(s); etc.

As described above, all switches in a storage area network need not be virtualization switches. In other words, a switch may be a standard switch in which none of the ports implement "intelligent," virtualization functionality.

Although the technique of the present invention has been described by way of example in the context of the WAFS architectures, the block cache mechanism of the present invention may also be realized in other architectures such as, for example, routers, switches, relays, etc., as long as suitable storage for the block cache mechanism is available.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:
receiving a first block level access request from a first host on the first LAN, wherein the first block level access request corresponds to a block level read request for accessing a desired portion of block data corresponding to a first location in the remote volume;
caching a first portion of block data in the first block cache mechanism in response to the first block level access request, wherein the caching of the first portion of block data is implemented using a block level protocol;
determining that a second portion of the desired portion of block data is cached in the first block cache mechanism;
retrieving, using a block level protocol, the second portion of the desired portion of block data from the first block cache mechanism; and
providing the retrieved second portion of the desired portion of block data to the first host.

2. The method of claim 1 wherein the block level protocol is selected from a group of block level protocols consisting of: iSCSI, SCSI, ATA, SAS/SATA, and IDE.

3. The method of claim 1 wherein the remote volume corresponds to a volume in a storage area network which is accessible via a fibre channel fabric.

4. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:
receiving a first block level access request from a first host on the first LAN, wherein the first block level access request corresponds to a block level read request for accessing a desired portion of block data corresponding to a first location in the remote volume, and wherein the first portion of block data corresponds to a first portion of the desired portion of block data;
caching a first portion of block data in the first block cache mechanism in response to the first block level access request, wherein the caching of the first portion of block data is implemented using a block level protocol;

determining that the first portion of block data is not cached in the first block cache mechanism;

retrieving the first portion of block data from the remote volume using a block level protocol; and providing the first portion of block data to the first host.

5. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:

receiving a first block level access request from a first host on the first LAN, wherein the first block level access request corresponds to a block level read request for accessing a desired portion of block data corresponding to a first location in the remote volume, and wherein the first portion of block data corresponds to a first portion of the desired portion of block data;

caching a first portion of block data in the first block cache mechanism in response to the first block level access request, wherein the caching of the first portion of block data is implemented using a block level protocol;

determining that the first portion of block data is not cached in the first block cache mechanism;

retrieving the first portion of block data from the remote volume using a block level protocol;

determining that a second portion of the desired portion of block data is cached in the first block cache mechanism;

retrieving the second portion of the desired portion of block data from the first block cache mechanism using the block level protocol; and providing the first and second portion of the desired portion of block data to the first host via the first LAN.

6. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:

receiving a first block level access request from a first host on the first LAN, wherein the first block level access request corresponds to a block level write request for accessing a desired portion of block data corresponding to a first location in the remote volume;

caching a first portion of block data, in the first block cache mechanism in response to the first block level access request, wherein the caching of the first portion of block data is implemented using a block level protocol;

determining that a second portion of the desired portion of block data is cached in the first block cache mechanism;

updating, using a block level protocol, the second portion of the desired portion of block data in the first block cache mechanism using information from the block level write request.

7. The method of claim 6 further comprising:

identifying the updated second portion of block data in the first block cache mechanism as dirty data which has not yet been stored in the remote volume; and performing a block level write operation over the WAN to cause the updated second portion of block data in the first block cache mechanism to be stored at the remote volume.

8. The method of claim 6 further comprising providing a block level write confirmation response message to the first host before the entirety of the desired portion of block data has been written to the remote volume.

9. A method for facilitating block level access operations to be performed at a remote volume via a wide area network (WAN), the block level access a operations being initiated by at least one host which is a member of a first local area network (LAN), the first LAN including a first block cache mechanism configured or designed to cache block data in accordance with a block level protocol, the method comprising:

receiving a first block level access request from a first host on the first LAN, wherein the first block level access request corresponds to a block level write request for accessing a desired portion of block data corresponding to a first location in the remote volume;

caching a first portion of block data in the first block cache mechanism in response to the first block level access request, wherein the caching of the first portion of block data is implemented using a block level protocol;

determining that a second portion of the desired portion of block data is not cached in the first block cache mechanism; and populating, using a block level protocol, the first block cache mechanism with the second portion of the desired portion of block data using information from the block level write request.

10. The method of claim 9 further comprising:

identifying the second portion of block data in the first block cache mechanism as new data which has not yet been stored in the remote volume; and performing a block level write operation over the WAN to cause the second portion of block data in the first block cache mechanism to be stored at the remote volume.

11. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:

receiving a first block level access request from a first host on the first LAN;

caching a first portion of block data in the first block cache mechanism in response to the first block level access request, wherein the caching of the first portion of block data is implemented using a block level protocol;

identifying a second portion of block data in the first block cache mechanism as dirty data which has not yet been stored in the remote volume; and performing a block level write operation over the WAN to cause the second portion of block data in the first block cache mechanism to be stored at the remote volume.

12. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:

receiving a first block level access request from a first host on the first LAN, wherein the first block level access request corresponds to a block level write request for storing a desired portion of block data at a first location in the remote volume;

caching a first portion of block data in the first block cache mechanism in response to the first block level access request, wherein the caching of the first portion of block data is implemented using a block level protocol;

caching, using a block level protocol, the desired portion of block data in the first block cache mechanism;

deferring initiation of a block level write operation to cause the desired portion of block data in the first block cache mechanism to be stored at the remote volume in response to a determination that the remote volume is inaccessible;

performing, in response to a determination that the remote volume is accessible, the block level write operation to cause the desired portion of block data in the first block cache mechanism to be stored at the remote volume.

13. A method for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the method comprising:

receiving a first block level access request from a first host on the first LAN;

caching a first portion of block data in the first block cache mechanism in response to the first block level access request;

wherein the caching of the first portion of block data is implemented using a block level protocol;

identifying a second portion of block data in the first block cache mechanism as dirty data which has not yet been stored in the remote volume; and performing a block level write operation on over the WAN to cause the second portion of block data in the first block cache mechanism to be stored at the remote volume.

14. A system for facilitating block level access operations to be performed at a remote volume via a wide area network (WAN), the block level access operations being initiated by at least one host which is a member of a first local area network (LAN), the system comprising:

at least one processor;

at least one interface configured or designed to provide a communication link to at least one other network device;

memory; and a first block cache mechanism configured or designed to cache block data in accordance with a block level protocol;

the system being operable to:

receive a first block level access request from a first host on the first LAN, wherein the first block level access request corresponds to a block level read request for accessing a desired portion of block data corresponding to a first location in the remote volume;

cache a first portion of block data in the first block cache mechanism in response to the first block level access request, wherein the cache of the first portion of block data is implemented using a block level protocol;

determine that a second portion of the desired portion of block data is cached in the first block cache mechanism;

retrieve, using a block level protocol, the second portion of the desired portion of block data from the first block cache mechanism; and provide the retrieved second portion of the desired portion of block data to the first host.

15. A system for facilitating block level access operations to be performed at a remote volume via a wide area network (WAN), the block level access operations being initiated by at least one host which is a member of a first local area network (LAN), the system comprising:

at least one processor;

at least one interface configured or designed to provide a communication link to at least one other network device;

memory; and a first block cache mechanism configured or designed to cache block data in accordance with a block level protocol;

the system being operable to:

receive a first block level access request from a first host on the first LAN, wherein the first block level access request corresponds to a block level read request for accessing a desired portion of block data corresponding to a first location in the remote volume, and wherein the first portion of block data corresponds to a first portion of the desired portion of block data;

cache a first portion of block data in the first block cache mechanism in response to the first block level access request, wherein the cache of the first portion of block data is implemented using a block level protocol;

determine that the first portion of block data is not cached in the first block cache mechanism;

retrieve the first portion of block data from the remote volume using a block level protocol; and provide the first portion of block data to the first host.

16. The system of claim 15 wherein the block level protocol is selected from a group of block level protocols consisting of: iSCSI, SCSI, ATA, SAS/SATA, and IDE.

17. The system of claim 15 wherein the remote volume corresponds to a volume in a storage area network which is accessible via a fibre channel fabric.

18. A system for facilitating block level access operations to be performed at a remote volume via a wide area network (WAN), the block level access operations being initiated by at least one host which is a member of a first local area network (LAN), the system comprising:

at least one processor;

at least one interface configured or designed to provide a communication link to at least one other network device;

memory; and a first block cache mechanism configured or designed to cache block data in accordance with a block level protocol;

the system being operable to:

receive a first block level access request from a first host on the first LAN, wherein the first block level access request corresponds to a block level read request for accessing a desired portion of block data corresponding to a first location in the remote volume, and wherein the first portion of block data corresponds to a first portion of the desired portion of block data;

cache a first portion of block data in the first block cache mechanism in response to the first block level access request, wherein the cache of the first portion of block data is implemented using a block level protocol;
determine that the first portion of block data is not cached in the first block cache mechanism;
retrieve the first portion of block data from the remote volume using a block level protocol;
determine that a second portion of the desired portion of block data is cached in the first block cache mechanism;
retrieve the second portion of the desired portion of block data from the first block cache mechanism using the block level protocol; and
provide the first and second portion of the desired portion of block data to the first host via the first LAN.

19. A system for facilitating block level access operations to be performed at a remote volume via a wide area network (WAN), the block level access operations being initiated by at least one host which is a member of a first local area network (LAN), the system comprising:
at least one processor;
at least one interface configured or designed to provide a communication link to at least one other network device;
memory; and
a first block cache mechanism confirmed or designed to cache block data in accordance with a block level protocol;
the system being operable to:
receive a first block level access request from a first host on the first LAN, wherein the first block level access request corresponds to a block level write request for accessing a desired portion of block data corresponding to a first location in the remote volume;
cache a first portion of block data in the first block cache mechanism in response to the first block level access request wherein the cache of the first portion of block data is implemented using a block level protocol;
determine that a second portion of the desired portion of block data is cached in the first block cache mechanism;
update, using a block level protocol, the second portion of the desired portion of block data in the first block cache mechanism using information from the block level write request.

20. The system of claim 19 being further configured or designed to:
identify the updated second portion of block data in the first block cache mechanism as dirty data which has not yet been stored in the remote volume; and
perform a block level write operation over the WAN to cause the updated second portion of block data in the first block cache mechanism to be stored at the remote volume.

21. The system of claim 19 being further configured or designed to provide a write confirmation response message to the first host before the entirety of the desired portion of block data has been written to the remote volume.

22. A system for facilitating block level access operations to be performed at a remote volume via a wide area network (WAN), the block level access operations being initiated by at least one host which is a member of a first local area network (LAN), the system comprising:
at least one processor;
at least one interface configured or designed to provide a communication link to at least one other network device;
memory; and
a first block cache mechanism configured or designed to cache block data in accordance with a block level protocol;
the system being operable to:
receive a first block level access request from a first host on the first LAN, wherein the first block level access request corresponds to a block level write request for accessing a desired portion of block data corresponding to a first location in the remote volume;
cache a first portion of block data in the first block cache mechanism in response to the first block level access request, wherein the cache of the first portion of block data is implemented using a block level protocol;
determine that a second portion of the desired portion of block data is not cached in the first block cache mechanism; and
populating, using a block level protocol, the first block cache mechanism with the second portion of the desired portion of block data using information from the block level write request.

23. The system of claim 22 being further configured or designed to:
identify the second portion of block data in the first block cache mechanism as new data which has not yet been stored in the remote volume; and
perform a block level write operation over the WAN to cause the second portion of block data in the first block cache mechanism to be stored at the remote volume.

24. A system for facilitating block level access operations to be performed at a remote volume via a wide area network (WAN), the block level access operations being initiated by at least one host which is a member of a first local area network (LAN), the system comprising:
at least one processor;
at least one interface configured or designed to provide a communication link to at least one other network device;
memory; and
a first block cache mechanism configured or designed to cache block data in accordance with a block level protocol;
the system being operable to:
receive a first block level access request from a first host on the first LAN;
cache a first portion of block data in the first block cache mechanism in response to the first block level access request wherein the cache of the first portion of block data is implemented using a block level protocol;
identify a second portion of block data in the first block cache mechanism as dirty data which has not yet been stored in the remote volume; and
perform a block level write operation over the WAN to cause the second portion of block data in the first block cache mechanism to be stored at the remote volume.

25. A system for facilitating block level access operations to be performed at a remote volume via a wide area network (WAN), the block level access operations being initiated by at least one host which is a member of a first local area network (LAN), the system comprising:
at least one processor;
at least one interface configured or designed to provide a communication link to at least one other network device;
memory; and
a first block cache mechanism configured or designed to cache block data in accordance with a block level protocol;
the system being operable to:
receive a first block level access request from a first host on the first LAN, wherein the first block level access request corresponds to a block level write request for storing a desired portion of block data at a first location in the remote volume;

cache a first portion of block data in the first block cache mechanism in response to the first block level access request, wherein the cache of the first portion of block data is implemented using a block level protocol;

cache, using a block level protocol, the desired portion of block data in the first block cache mechanism;

deferring initiation of a block level write operation to cause the desired portion of block data in the first block cache mechanism to be stored at the remote volume in response to a determination that the remote volume is inaccessible;

perform, in response to a determination that the remote volume is accessible, the block level write operation to cause the desired portion of block data in the first block cache mechanism to be stored at the remote volume.

26. A system for facilitating block level access operations to be performed at a remote volume via a wide area network (WAN), the block level access operations being initiated by at least one host which is a member of a first local area network (LAN), the system comprising:

at least one processor;

at least one interface configured or designed to provide a communication link to at least one other network device;

memory;

a first block cache mechanism configured or designed to cache block data in accordance with a block level protocol; and an edge device configured or designed to provide a communication link over the WAN between devices on the LAN and the remote volume, wherein the edge device includes the first block cache mechanism;

the system being operable to:

receive a first block level access request from a first host on the first LAN;

cache a first portion of block data in the first block cache mechanism in response to the first block level access request, wherein the cache of the first portion of block data is implemented using a block level protocol.

27. A system for facilitating block level access operations to be performed at a remote volume via a wide area network (WAN), the block level access operations being initiated by at least one host which is a member of a first local area network (LAN), the system comprising:

at least one processor;

at least one interface configured or designed to provide a communication link to at least one other network device in the data network;

a first block cache mechanism configured or designed to cache block data in accordance with a block level protocol; and memory;

the system being configured or designed to receive a first block level access request from a first host on the first LAN;

the system being configured or designed to cache a first portion of block data in the first block cache mechanism in response to the first block level access request;

wherein the caching of the first portion of block data is implemented using a block level protocol;

the system being configured or designed to identify a second portion of block data in the first block cache mechanism as dirty data which has not yet been stored in the remote volume;

the system being configured or designed to perform a block level write operation over the WAN to cause the second portion of block data in the first block cache mechanism to be stored at the remote volume.

28. A system for facilitating block level access operations to be performed at a remote volume via a wide area network (WAN), the block level access operations being initiated by at least one host which is a member of a first local area network (LAN), the first LAN including a first block cache mechanism configured or designed to cache block data in accordance with a block level protocol, the system comprising:

means for receiving a first block level access request from a first host on the first LAN;

means for caching a first portion of block data in the first block cache mechanism in response to the first block level access request;

wherein the caching of the first portion of block data is implemented using a block level protocol;

means for identifying a second portion of block data in the first block cache mechanism as dirty data which has not yet been stored in the remote volume; and means for performing a block level write operation over the WAN to cause the second portion of block data in the first block cache mechanism to be stored at the remote volume.

29. The system of claim 28 wherein the first block level access request corresponds to a block level read request for accessing a desired portion of block data corresponding to a first location in the remote volume, and wherein the first portion of block data corresponds to a first portion of the desired portion of block data, the system further comprising:

means for determining that the first portion of block data is not cached in the first block cache mechanism;

means for retrieving the first portion of block data from the remote volume using a block level protocol;

means for determining that a second portion of the desired portion of block data is cached in the first block cache mechanism;

means for retrieving the second portion of the desired portion of block data from the first block cache mechanism using the block level protocol; and means for providing the first and second portion of the desired portion of block data to the first host via the first LAN.

30. The system of claim 28 wherein the first block level access request corresponds to a block level write request for storing a desired portion of block data at a first location in the remote volume, the system further comprising:

means for caching, using a block level protocol, the desired portion of block data in the first block cache mechanism;

means for deferring initiation of a block level write operation to cause the desired portion of block data in the first block cache mechanism to be stored at the remote volume in response to a determination that the remote volume is inaccessible;

means for performing, in response to a determination that the remote volume is accessible, the block level write operation to cause the desired portion of block data in the first block cache mechanism to be stored at the remote volume.

* * * * *